United States Patent

Stoneham

[11] 3,757,658
[45] Sept. 11, 1973

[54] FILM METERING MECHANISM FOR CAMERAS
[75] Inventor: Jeffrey R. Stoneham, Rochester, N.Y.
[73] Assignee: Eastman Kodak Company, Rochester, N.Y.
[22] Filed: May 24, 1972
[21] Appl. No.: 256,553

[52] U.S. Cl. .......... 95/31 FM, 95/31 FL, 95/31 AC
[51] Int. Cl. ............................................. G03b 1/62
[58] Field of Search ...................... 95/31 FM, 31 FL, 95/31 AC

[56] References Cited
UNITED STATES PATENTS
3,633,477  1/1972  Hackenberg et al.................... 95/11
3,603,236  9/1971  Engelsmann..................... 95/31 FM Primary Examiner—Robert P. Greiner
Attorney—W. H. J. Kline et al.

[57] ABSTRACT

A camera for perforated roll film includes transport means for advancing the film along an exposure plane, a metering lever biased toward an active position to disable the transport means, and a film sensing member for detecting the arrival of a perforation at a predetermined position to permit movement of the metering lever to its active position. Means associated with the sensing pawl and the metering lever hold the sensing pawl in the perforation until metering is effected and thereupon permits movement of the sensing pawl out of the perforation.

6 Claims, 3 Drawing Figures

FILM METERING MECHANISM FOR CAMERAS

CROSS-REFERENCE TO RELATED APPLICATION

Reference is made to commonly assigned, copending U.S. Pat. application Ser. No. 203,732 entitled FILM METERING MECHANISM FOR CAMERAS, filed in the name of Alexander A. Peters on Dec. 1, 1971.

BACKGROUND OF THE INVENTION

1. Field of the Invention

This invention relates to devices for metering perforated roll film in cameras, and more particularly to such a device adapted to eliminate or reduce the risk of film movement in the camera during shutter operation.

2. Description of the Prior Art

Devices for metering successive roll film exposures by arresting the film winding mechanism in response to sensing of perforations or notches precut in the film at specific intervals are old and well known in the art. Commonly assigned U.S. Pat. No. 3,148,605 which issued Sept. 15, 1964 in the names of Dean M. Peterson et al shows a camera film transport mechanism including a sensing pawl which detects the arrival of a perforation at a predetermined location to disable the transport mechanism. A shutter release lever may then be depressed to release a high energy lever associated with the shutter mechanism and to thereafter withdraw the sensing pawl from the perforation. During the exposure interval, spring force on the sensing pawl urges the sensing pawl against the trailing edge of the film perforation. It has been found that occasionally the pressure on the film from the sensing pawl, coupled with vibrations in the camera when the high energy lever is rapidly moved, will cause film movement during the exposure interval. In cameras equipped with percussion-ignitable flash, the camera vibrations are increased, thereby increasing the risk of film movement.

The risk of film movement can be reduced by leaving the sensing pawl in a film perforation only during that period of time when the film is being advanced and by removing the pawl from the perforation before the picture-taking operation. In his commonly assigned, copending U.S. Pat. application Ser. No. 203,732, entitled FILM ADVANCE AND METERING MECHANISM FOR CAMERAS, filed Dec. 1, 1971, Alexander A. Peters described a camera mechanism for so removing the sensing pawl from the perforation at the end of the film advance operation. That mechanism included a film transport and metering device having a gear mounted for reciprocal movement away from a rest position for advancing film along an exposure plane and a film sensing pawl movable between a retracted position on one side of the exposure plane and an extended position traversing the exposure plane when intercepting one of the film perforations. Means interconnecting the film advancing gear and the sensing pawl was provided for moving the pawl to its retracted position in response to movement of the gear to its rest position. While the metering mechanism disclosed in the Peters application is effective for accomplishing its intended purpose, and in fact has proven to operate successfully in engineering models, it requires a number of elements which add to the expense of manufacture.

SUMMARY OF THE INVENTION

I have found that the problem of film movement can be reduced or eliminated by a mechanism less complex than that disclosed in the Peters application. Accordingly, an object of the present invention is to provide a film advancing and metering mechanism for a camera wherein a film sensing pawl moves into a perforation to effect metering of the film transport mechanism and is allowed to move from that perforation at the end of the film advance operation by means simple in construction and economical in manufacture.

In a preferred embodiment of the present invention, means are provided for holding the sensing pawl in a perforation against the force of a biasing spring only until the film transport means has been disabled at the end of the film advance operation, and thereupon to permit removal of the sensing pawl from the perforation by the biasing means.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
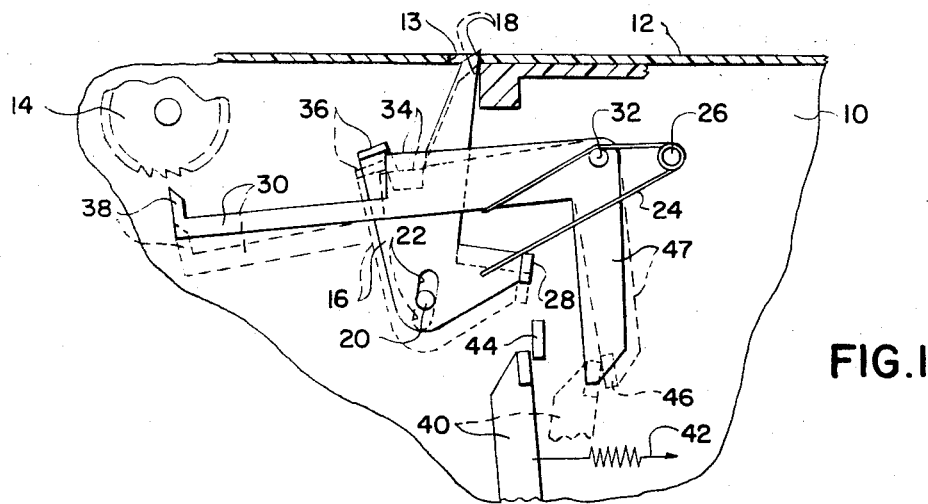
FIGS. 1-3 are plan views of a portion of a camera in accordance with the present invention wherein the camera elements are illustrated to show sequential relative positions of various pertinent parts during stages of operation of the mechanism.

Because cameras are well known, the present description will be directed in part to elements forming part of, or cooperating more directly with, apparatus in accordance with the present invention. It is to be understood that camera elements not specifically shown or described may take various forms well known to those skilled in the art.

Referring to the drawings, a camera having a housing 10 is adapted to receive roll film 12 with perforations 13 at predetermined metering intervals. A film transport means can be operated to advance the film along the camera's exposure plane and includes a ratchet wheel 14 which rotates in a counterclockwise direction as viewed in the drawings as the film is advanced. The metering device of the camera includes a sensing member 16 having a film sensing pawl 18 mounted on a pin 20 which extends through a slot 22 in the sensing member. A spring 24, which is entwined around a post 26 engages a tab 28 on the sensing member to bias the sensing member in both a clockwise direction around pin 20, and, at the same time, away from the camera's exposure plane.

A metering lever 30 is rotatably mounted on a pivot pin 32 and is heavily biased in a clockwise direction by the other leg of spring 24 which is wrapped about the lever. Metering lever 30 has an abutment surface 34 which cooperates with a tab 36 on sensing member 16 and a metering pawl 38 adapted to cooperate with ratchet wheel 14 in a manner to be described. A high energy lever or shutter driver 40 is heavily biased by a spring 42 and is prevented from moving under the influence of the spring means by a stop 44 until the camera's shutter release lever, not shown, is depressed. Upon such movement of the high energy lever, it engages a tab 46 on a leg 47 of metering lever 30 to rotate the metering lever in a counterclockwise direction against the force of spring 24.

OPERATION

FIG. 1 shows the camera elements in two relative positions. The phantom line position of the elements is assumed after the camera has been operated to effect an exposure and prior to film advancement. At that time, sensing pawl 18 rests upon the surface of film 12 and is out of alignment with a perforation (perforation 13 being spaced to the right of its position shown in FIG. 1). Tab 36 on sensing member 16 is hooked over the corner of surface 34 on the metering lever so that the force of spring 24 urges the sensing pawl into engagement with the film (there is more force on metering lever 30 from spring 24 tending to move the sensing member toward the film than on tab 28 of the sensing member tending to move the sensing pawl away from the film). Metering pawl 38 is held out of engagement with ratchet wheel 14 by tab 36 engaging surface 34 and by pawl 18 engaging the film surface.

Figure 2:
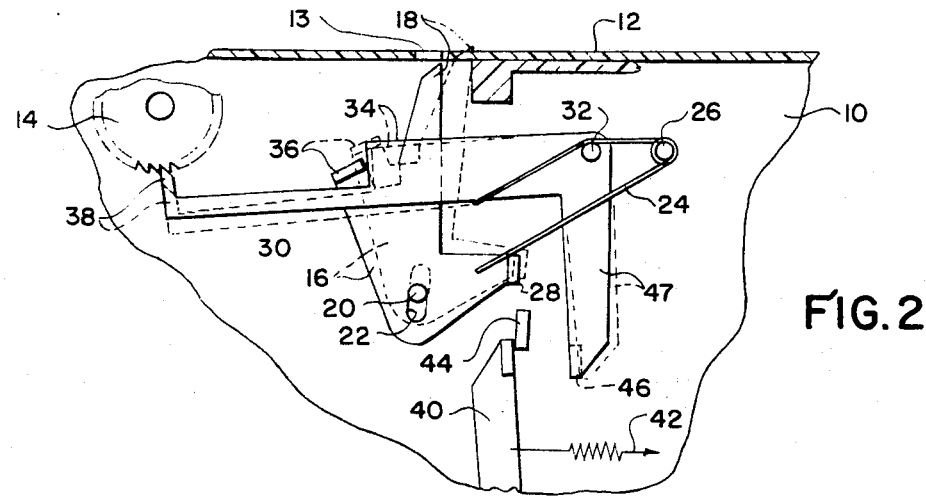

As film is advanced, high energy lever 40 is moved from its phantom line position in FIG. 1 to its full line position by means not shown. Continued advancement of the film brings a film perforation 13 into alignment with sensing pawl 18, whereupon spring 24 acting on the pawl through metering lever 30 moves sensing member 16 from its phantom line to its full line position, sensing pawl 18 extending through the perforation. The camera elements are now in their respective positions shown in full line in FIG. 1 and in phantom line in FIG. 2, and the metering mechanism has not yet been activated to disable the film transport means.

Now, as film is continued to be advanced, the trailing edge of film perforation 13 pushes on sensing pawl 18 to rotate sensing member 16 in a counterclockwise direction against the force of spring 24 acting on tab 28. This continues until sensing member 16 reaches a metering position and tab 36 of the sensing member falls off of surface 34, thereby permitting simultaneous movement of metering lever 30 in a clockwise direction until metering pawl 38 engages ratchet wheel 14 and movement of sensing member 16 in direction withdrawing sensing pawl 18 from the perforation. Both of these movements are caused by spring 24. It will, of course, be recognized by those skilled in the art that a pair of springs may be used rather than single spring 24. The camera elements are now in their respective positions shown in full line in FIG. 2 and phantom line in FIG. 3, and the camera is ready for making an exposure.

Figure 3:
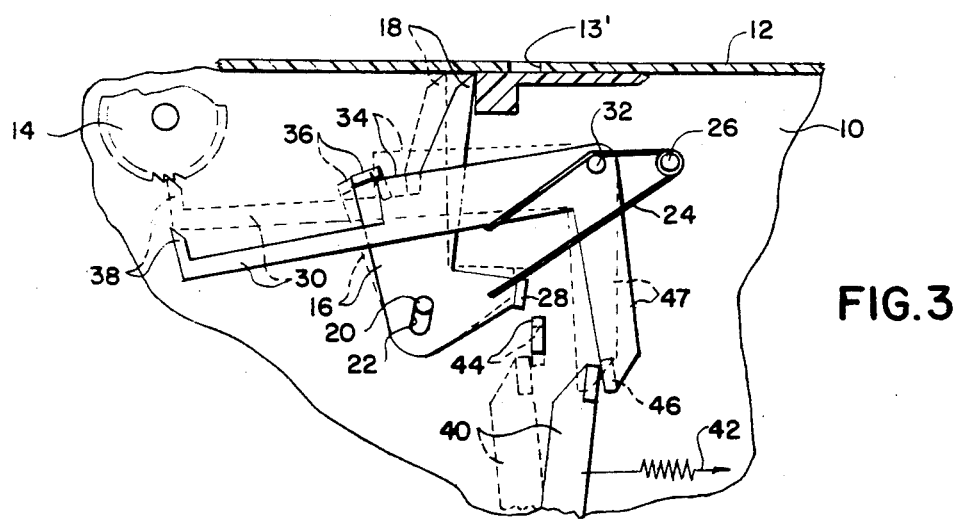

To effect an exposure, the operator depresses the camera's shutter release lever, not shown, which moves stop 44 upwardly as viewed in FIG. 3 to release high energy lever 40. During its travel, the high energy lever trips the camera's shutter mechanism, not shown, and engages tab 46 on metering lever 30 to rotate the metering lever from its active position shown in phantom lines in FIG. 3 to an inactive position withdrawing metering pawl 38 from ratchet wheel 14. In so moving, metering lever 30 clears tab 36 on sensing member 16 so that spring 24 can rotate the sensing member in a clockwise direction to its full line position in FIG. 3, such full line position corresponding to the phantom line position of FIG. 1. Now the camera mechanism has returned, full cycle, to the phantom line position of FIG. 1, and the operator may once again advance film to the next succeeding unexposed frame whereupon pawl 18 will enter the next perforation 13'.

Since at the time of an exposure pawl 18 has been removed from the film perforation, the force of spring 24 is not transmitted to the film. Otherwise, such force might cause film movement in a rearwardly direction at the time of exposure because there is usually some jarring of the camera when the high energy lever strikes the shutter mechanism.

The invention has been described in detail with particular reference to a preferred embodiment thereof, but it will be understood that variations and modifications can be effected within the spirit and scope of the invention.

I claim:

1. In a camera adapted to receive perforated roll film and having (1) transport means for advancing received film along an exposure plane, (2) a sensing pawl movable from a retracted position on one side of said exposure plane to an extended position through a film perforation for detecting the arrival of the film perforation at a predetermined position and (3) metering means associated with said transport means and said sensing pawl for disabling said transport means upon arrival of a film perforation at said predetermined position; the improvement comprising:
   resilient means for urging said sensing pawl toward its retracted position; and
   means for holding said sensing pawl in its extended position against the urging of said resilient means only until a perforation has arrived at said predetermined position and for thereupon enabling said resilient means to move said sensing pawl to its retracted position.

2. The improvement as defined in claim 1 wherein:
   said metering means includes (1) a lever movable between an active position disabling said transport means and an inactive position, (2) spring means urging said lever toward its active position and (3) means on said lever cooperative with said sensing pawl for preventing movement of said lever to its active position until the perforation has arrived at said predetermined position; and
   said means for holding said sensing pawl in its extended position includes a surface on said lever engageable by said sensing pawl only until a perforation has reached said predetermined position.

3. In a camera adapted to receive roll film and having (1) transport means for advancing received film along an exposure plane, (2) a sensing pawl movable from one side of said exposure plane to an extended position traversing said exposure plane through a film perforation and to a metering position from its extended position by advancing film, said metering position being spaced from said extended position in the direction of film travel and (3) metering means associated with said transport means and said sensing pawl for disabling said transport means when said sensing pawl has moved to its metering position; the improvement comprising:
   a spring urging said sensing pawl out of the film perforation toward said one side of said exposure plane; and
   means for holding said sensing pawl in a perforation when in its extended position and until said sensing pawl has been moved to its metering position.

4. The improvement as defined in claim 3 wherein:

said metering means includes (1) a lever movable between an active position and an inactive position, (2) means on said lever for disabling said transport means when said lever is in its active position and (3) resilient means for urging said lever toward its active position; and said holding means includes abutment surfaces on said lever and said sensing pawl, said abutment surfaces being arranged to block movement of said sensing pawl from a film perforation until said sensing pawl has moved to its metering position.

5. The improvement as defined in claim 4 wherein said abutment surfaces are further arranged to block movement of said lever to its active position until said sensing pawl has moved to its metering position.

6. In a camera having (1) means for receiving roll film perforated at predetermined metering intervals, (2) transport means for advancing received film along an exposure plane, (3) a film sensing pawl having a generally rectilinear movement sequentially between a first position contacting the surface of received film at said exposure plane, an extended position traversing said exposure plane when intercepting a film perforation, a metering position to which said sensing pawl is moved from its extended position by the trailing edge of a film perforation as film is advanced and a fourth position removed from the perforation, (4) a metering lever movable between an active position disabling said transport means and an inactive position, (5) spring means for urging said sensing pawl out of a perforation and toward its first position, (6) resilient means for urging said metering lever toward its active position; the improvement comprising means associated with said sensing pawl and said metering lever:

for holding said metering lever in its inactive position when said sensing pawl is in its first position and until said sensing pawl reaches its metering position; and for holding said sensing pawl in a perforation until it reaches its metering position and for thereupon permitting movement of said sensing pawl to its fourth position by said spring means.

* * * * *